(12) United States Patent
Freeman et al.

(10) Patent No.: US 7,401,361 B2
(45) Date of Patent: Jul. 15, 2008

(54) SYSTEM AND METHOD FOR REDUCING VIRUS SCAN TIME

(75) Inventors: Joseph Wayne Freeman, Raleigh, NC (US); Steven Dale Goodman, Raleigh, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 728 days.

(21) Appl. No.: 10/963,888

(22) Filed: Oct. 13, 2004

(65) Prior Publication Data

US 2006/0080737 A1 Apr. 13, 2006

(51) Int. Cl.
*G06F 12/14* (2006.01)
*G06F 11/30* (2006.01)
*G06F 17/30* (2006.01)

(52) U.S. Cl. .................. 726/22; 726/24; 713/156; 713/189; 713/193; 713/194; 705/51; 707/204

(58) Field of Classification Search .............. 726/22, 726/24; 713/189–194, 156; 705/51–54; 707/204
See application file for complete search history.

(56) References Cited

U.S. PATENT DOCUMENTS

| 5,649,095 | A |  | 7/1997 | Cozza | 714/39 |
| 6,049,874 | A |  | 4/2000 | McClain et al. | 713/176 |
| 6,094,731 | A |  | 7/2000 | Waldin et al. | 714/38 |
| 6,101,585 | A |  | 8/2000 | Brown et al. | 711/162 |
| 6,397,229 | B1 | * | 5/2002 | Menon et al. | 707/204 |
| 6,611,925 | B1 |  | 8/2003 | Spear | 714/38 |
| 6,735,700 | B1 | * | 5/2004 | Flint et al. | 726/24 |
| 2002/0016925 | A1 |  | 2/2002 | Pennec et al. | 713/201 |
| 2002/0138695 | A1 |  | 9/2002 | Beardsley et al. | 711/113 |
| 2002/0166085 | A1 |  | 11/2002 | Peikari | 714/38 |
| 2002/0174349 | A1 |  | 11/2002 | Wolff et al. | 713/188 |
| 2004/0193865 | A1 | * | 9/2004 | Nguyen et al. | 713/2 |

FOREIGN PATENT DOCUMENTS

JP 407021073 7/1993

OTHER PUBLICATIONS

Arnold et al., "System for Detecting Undesired Alteration of Software," *IBM Technical Disclosure Bulletin*, v. 32, n. 11, p. 48-50, Apr. 1990.

* cited by examiner

*Primary Examiner*—Emmanuel L Moise
*Assistant Examiner*—Minh Dieu Nguyen
(74) *Attorney, Agent, or Firm*—VanLeeuwen & VanLeeuwen; Carlos Munoz-Bustamante

(57) ABSTRACT

A system and method that marks whenever a sector on a hard drive is altered. A protected archive bit is maintained for each sector on the hard drive in a secured fashion. Authenticated requests are able to reset the protected archive bit. When a file is changed, the hard drive marks the sectors of the program that have been altered. When the virus protection application executes, it retrieves the sectors that have been altered, identifies the files that correspond to such sectors, and scans the identified files. If a virus has attacked the computer and attached itself to one of the files, the file is identified and scanned and the virus is discovered with appropriate eradication actions performed. An authentication scheme is assigned to a hard drive with a secret that is shared between the drive and the virus protection program and stored in a secure location.

14 Claims, 9 Drawing Sheets

SYSTEM AND METHOD FOR REDUCING VIRUS SCAN TIME

BACKGROUND OF THE INVENTION

1. Technical Field

The present invention relates in general to a system and method for reducing the time needed to scan a hard drive for viruses. In particular, the present invention relates to a system and method securely marking files that have been altered and, therefore, need to be checked for possible viruses.

2. Description of the Related Art

The current network computing environment has provided a rich opportunity for a plethora of virus, worm, and Trojan horse programs to proliferate. Recent viruses, such as "mydoom.exe," often infect thousands, or even millions of computer systems. Some viruses, such as the "Melissa" virus cause considerable damage to computer systems and networks. In 1999, the Melissa virus forced Microsoft Corporation and other large companies to turn off their email systems until the virus could be contained.

Electronic infections include viruses, email viruses, worms, and Trojan horses. A virus is a small piece of software that piggybacks on real programs. For example, a virus might attach itself to a program such as a spreadsheet program. Each time the spreadsheet program runs, the virus also runs, and it has the chance to reproduce (by attaching to other programs) or wreak havoc on the computer system. An email virus moves around in email messages, and usually replicates itself by automatically mailing itself to other users found in the victim's email address book. A worm is a small piece of software that uses computer networks and security holes to replicate itself. A copy of the worm scans the network for another machine that has a specific security hole. A worm copies itself to the new machine using the security hole, and then starts replicating itself from there, as well. Finally, a Trojan horse is simply a computer program. The program claims to do one thing, such as a computer game) but instead does damage when it is executed (e.g., it may erase the user's hard disk). Trojan horses typically do not replicate automatically.

As used herein, the general term "virus" is used to include virus programs as well as email virus programs, worm programs, and Trojan horse programs. To respond to the thread of viruses, many companies have developed detection and removal software applications that, among other things, provide the ability to scan files on a computer system for the presence of viruses. Virus protection application software use "virus definitions" to identify viruses that may reside on a user's computer system. When a virus is identified, the virus protection software can often eradicate the virus by removing the malicious code from the software or, if removal is not possible, the program that has the virus can be quarantined so that it cannot be executed and cause damage to the computer.

One challenge in using virus protection software is that users delay running the software because a full scan of a large computer system can take a great deal of time. This is because a full scan generally requires the virus protection software to check every file on the computer system that may be hiding a virus. Of course, delaying the execution of the virus protection software exposes the user's computer to a greater chance of infection. Many users have dealt with this challenge by scheduling execution of their virus protection software at night or during a time that the user is not currently using the computer. While this solution may work in some situations, it is not always practical, or possible. For example, it is not always practical, or possible, to leave some computer systems running when the system is unattended. In addition, some systems, such as servers, do not have an "idle" period during which a full scan would not impact system usage.

Another approach to this challenge includes reducing the amount of data stored on a hard drive. However, this approach imposes an artificial limit on system capacity and results in increased costs as more hard drives are needed. Another approach that increase costs is to increase the computer resources to enable the scan to be performed more quickly. An additional approach has been to impose a limit on the resources that the virus scan software is able to utilize. However, this approach increases the time needed to run a full system scan.

A final approach has been to reduce the number of files that are scanned at one time so that only those files that have been altered since the last scan are scanned by the virus protection software application. One approach to performing an incremental scan would be to add a flag maintained by the file system, such as the "archive" flag found in many operating systems which is commonly used for performing incremental backups. Unfortunately, this approach also has a serious flaw. The flaw of this approach is that a virus can defeat the scheme, and thereby remain undetected, by mimicking the scanning program and marking the infected file(s) as "already scanned." Marking the infected files as already scanned would prevent the incremental virus protection software from scanning the infected files and discovering the virus.

What is needed, therefore, is a system and method that securely marking files that have already been scanned so that a virus is unable to mimic the marking activity. Furthermore, what is needed is a system and method where a hard drive maintains alteration information on a sector-by-sector basis in a secure fashion.

SUMMARY

It has been discovered that the aforementioned challenges are resolved with a system and method that has a hard drive that marks whenever a sector on the drive is altered. A protected archive bit is maintained for each sector on the hard drive in a secured fashion. Only authenticated processes, such as the virus protection application, are able to reset the protected archive bit. Viruses, operating without access to the authentication information needed to access the protected archive bit, are unable to mimic the virus protection software. When a virus attaches itself to a program, the hard drive marks the sectors of the program that have been altered. When the virus protection application executes, it retrieves the sectors that have been altered, identifies the files that correspond to such sectors, and scans the identified files. If a virus has attacked the computer and attached itself to one of the files, the file would be identified and scanned and the virus would be discovered with appropriate action performed (e.g., eradication of the virus, quarantine of the file, etc.).

An authentication scheme, such as a password or a public key-private key combination, is assigned to a hard drive. The password or key is referred to as a "secret." When the virus protection program is installed, the secret is shared with the virus protection program and the virus protection software stores the secret in a safe location (i.e., an encrypted file, sealed via TPM, etc.).

As referenced above, when the hard drive alters any of its sectors, it marks a protected archive bit corresponding to the sector indicating that the sector has been altered. When the virus protection program is executed, it retrieves the secret from the safe location. The virus protection software retrieves a list of altered sectors from the hard drive and determines the files that correspond to the sectors. These files are then scanned for viruses. If a virus is found, the virus is eradicated or the file is quarantined by the virus protection software. The protected archive bit corresponding to "clean" (or "cleaned") files is reset by the virus protection software by using the secret that allows the protected archive bits to be reset. In this manner, the virus protection software focuses on those files that have been altered since the last virus scan without needing to waste time scanning files that have not been altered.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
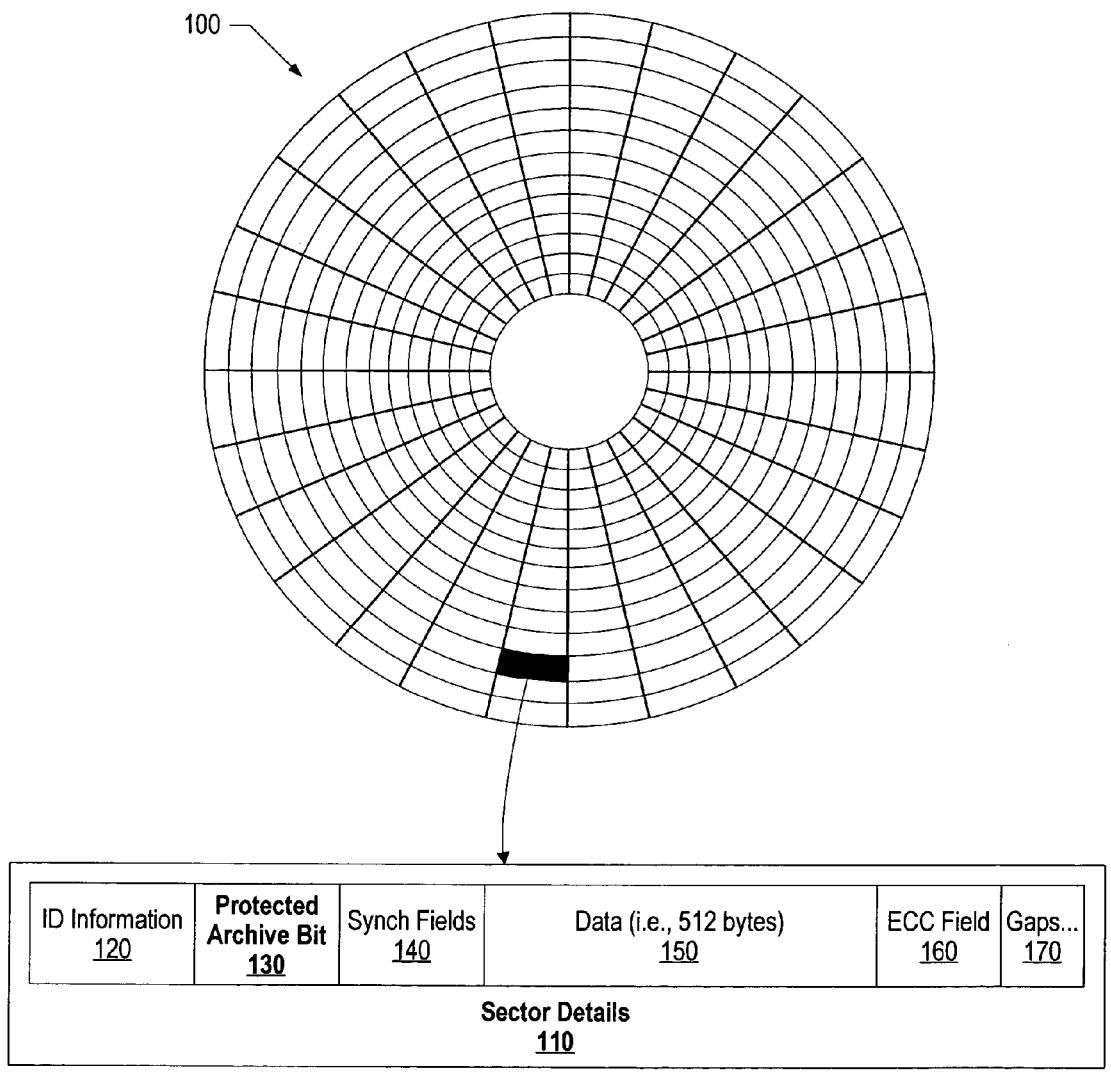
FIG. 1 is a diagram showing sectors on a disk along with sector details that shows a protected archive bit for each sector.

FIG. 1 is a diagram showing sectors on a disk along with sector details that shows a protected archive bit for each sector. Hard disk 100 is shown with a multitude of sectors with a sector being the smallest unit that is written or retrieved from the hard disk. It will be appreciated by those skilled in the art that, unlike the sectors shown in FIG. 1, the number of sectors in a given ring may vary depending on the scheme used by the drive manufacturer.

For each sector on the hard drive, an ample amount of metadata is stored in addition to the program or data file data that is stored in the sector. Because files are often larger than the sector size (e.g., 512 bytes), a single file may span several sectors which may, or may not, be stored adjacent to one another on the hard drive.

Sector details 110 outlines the data that is maintained for each of the sectors. Sector details 110 includes ID information 120, protected archive bit 130, synchronization fields 140, the actual data being stored 150, ECC fields 160, and various length physical gaps 170 between the end of the data corresponding to one sector and the beginning of data corresponding to the next sector.

Protected archive bit 130 is marked whenever data 150 is altered (i.e., whenever data is written to the sector). The protected archive bit can only be reset by an application in possession of a secret, such as a password, that is stored on the hard drive or in nonvolatile memory in a location accessible to the hard drive controller but not accessible by an application program. An application in possession of the secret passes the hard drive the sector identifiers of one or more sectors to reset and, if the secret used by the application is authentic, the hard drive controller resets the protected archive bits (130) corresponding to the received sector identifiers. It will be appreciated by those skilled in the art, having the benefit of the present detailed description, that other ways of securely identifying sectors that have been altered are readily available. For example, a table could be maintained by the hard drive controller, either in a protected nonvolatile memory or on a protected area of the disk, rather than using the protected archive bit disclosed herein. The protected table would then be used by the hard drive controller to mark which sectors have been altered.

Figure 2:
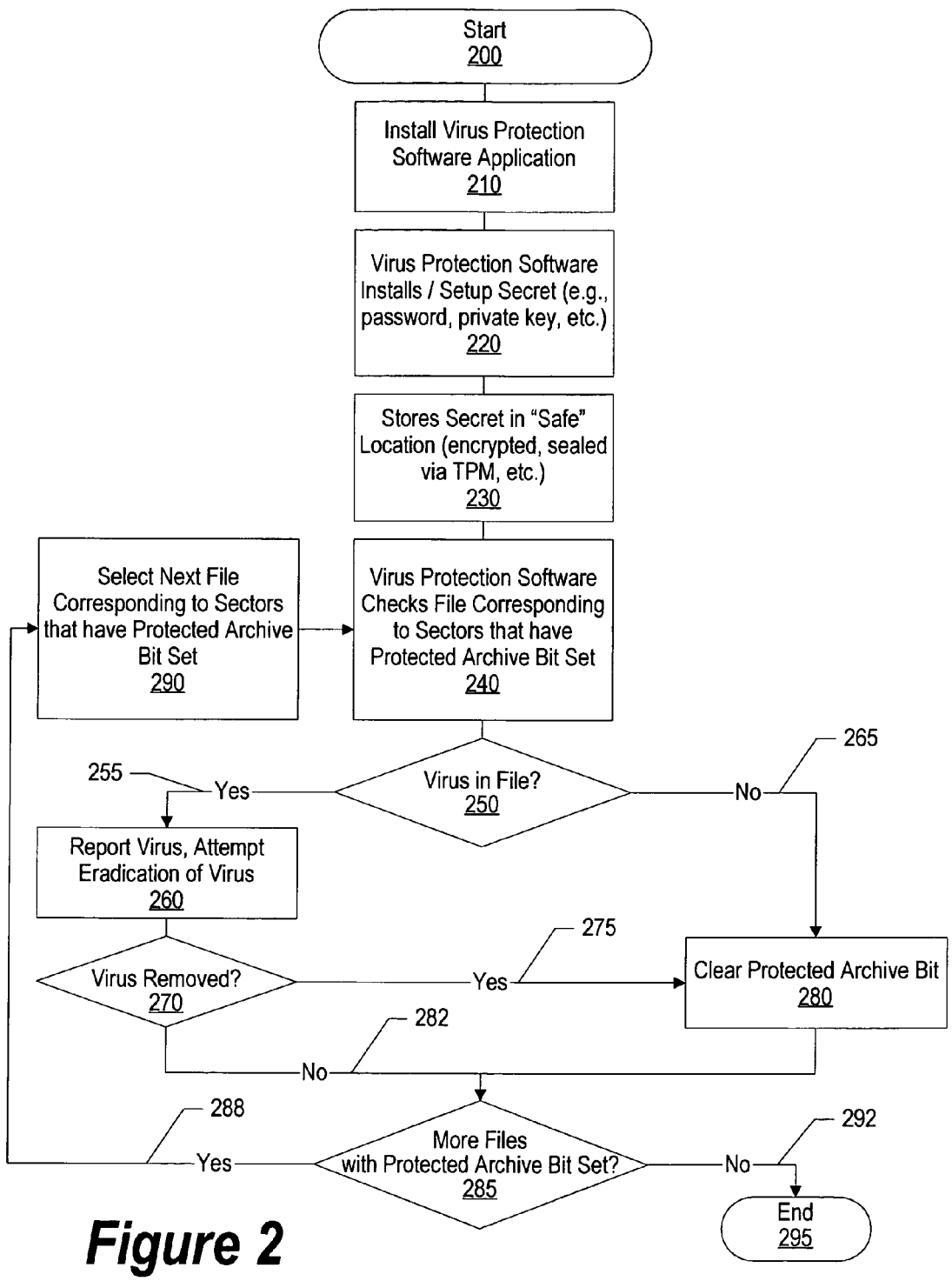
FIG. 2 is a flowchart showing basic steps taken by a virus protection software application when analyzing selected files based upon the protected archive bits.

FIG. 2 is a flowchart showing basic steps taken by a virus protection software application when analyzing selected files based upon the protected archive bits. Processing commences at 200 whereupon, at step 210, the user installs the virus protection application on the user's computer system. At step 220, the virus protection software establishes a secret, such as a password, key, etc., used to reset the protected archive bits stored on the hard drive. In one embodiment, the hard drive has a secret either pre-set by the manufacturer or configured by the user and this secret is shared with the virus protection application during step 220.

At step 230, the virus protection application stores the secret that is needed to reset protected archive bits in a secure location, such as an encrypted file, a location sealed by TPM, etc. When invoked, the virus protection application is then able to retrieve the secret from the safe location and use the secret to reset protected archive bits. At step 240, the virus protection application checks a file that corresponds to one or more sectors on the hard disk where the data has been altered, as indicated by the protected archive bits corresponding to the sectors.

A determination is made as to whether there is a virus in the file (decision 250). If there is a virus, decision 250 branches to "yes" branch 255 whereupon, at step 260, the virus is reported to the user and the virus protection application attempts to eradicate the virus and a determination is made as to whether the virus was successfully removed (decision 270). If the virus was successfully removed, decision 270 branches to "yes" branch 275 whereupon, at step 280, the protected archive bits for the sectors in which the file resides are reset, or cleared, indicating that the file has not been altered since the last virus scan. On the other hand, if the virus was unable to be removed, decision 270 branches to "no" branch 282 whereupon the protected archive bits are not reset and the virus protection application or user takes further action (i.e., deleting the file, quarantining the file, etc.) to eliminate the virus.

Returning to decision 250, if the checked file does not have a virus, decision 250 branches to "no" branch 265 whereupon, at step 280, the protected archive bits for the sectors in which the file resides are reset, or cleared, indicating that the file has not been altered since the last virus scan. A reset protected archive bit also indicates that the file was not infected with a virus when the file was last scanned by the virus protection application.

A determination is made as to whether there are more files that have been altered based upon the protected archive bits corresponding to the sectors in which the file is stored (decision 285). If there are more files to check, decision 285 branches to "yes" branch 288 whereupon, at step 290, the next file corresponding to sectors that have protected archive bits set is selected and processing loops back to scan the selected file for viruses. This looping continues until there are no more files to scan, at which point decision 285 branches to "no" branch 292 and processing ends at 295.

Figure 3:
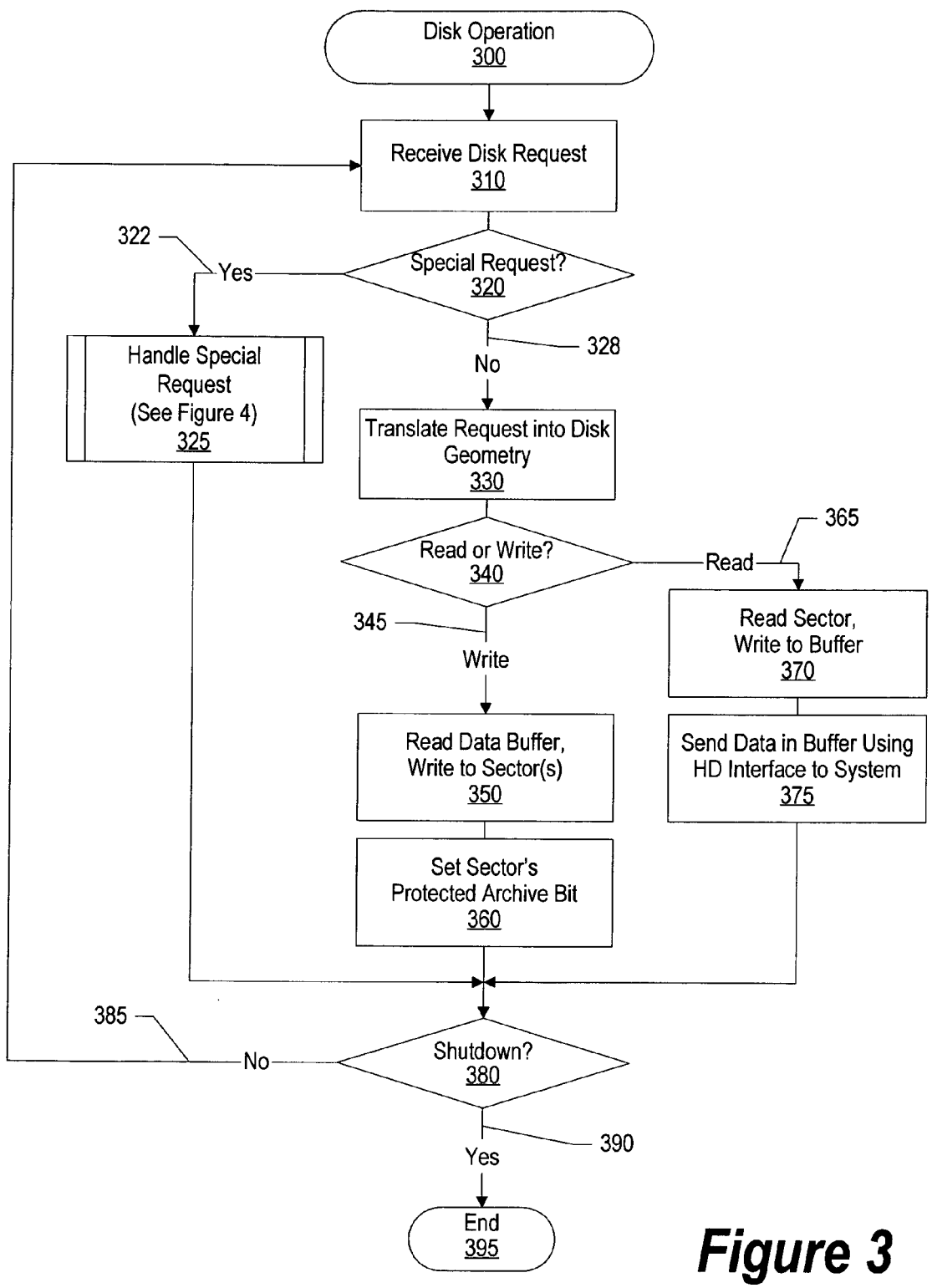
FIG. 3 is a flowchart showing disk operation that incorporates the protected archive bits.

FIG. 3 is a flowchart showing disk operation that incorporates the protected archive bits. Disk operation commences at 300 whereupon, at step 310, the disk receives a request. Traditionally, requests are sent over a bus connecting the disk controller to the processors.

A determination is made as to whether the request that was received is a "special request" dealing with the protected archive bits (decision 320). If the request is a special request, decision 320 branches to "yes" branch 322 whereupon, predefined process 325 is invoked to handle the special request (see FIG. 4 and corresponding text for processing details). On the other hand, if the request is not a special request, decision 320 branches to "no" branch 328 to process the "normal" request.

At step 330, the disk controller translates the request into the disk geometry used by the particular disk in order to find the requested sector. A determination is made as to whether the request is to read or write data to the sector (decision 340). If the request is to write data to the sector, decision 340 branches to "write" branch 345 whereupon, at step 350, the data to be written to the sector is read from the disk controller's buffer and written to the requested sector, and, at step 360, the protected archive bit corresponding to the sector is set indicating that the data in the sector has been altered since the last virus scan. On the other hand, if the request is to read data, decision 340 branches to "read" branch 365 whereupon the data in the requested sector is read and written to the buffer to be sent back to the processor, and, at step 375, the data in the buffer is sent back to the processor using the hard disk's interface, such as a high speed bus, to the computer system.

A determination is made as to whether a shutdown command has been received or power has been cut from the hard drive (decision 380). If the system is not shutting down, decision 380 branches to "no" branch 385 which loops back to receive and process the next request. This looping continues until the system is shutting down, at which point decision 380 branches to "yes" branch 390 and processing ends at 395.

Figure 4:
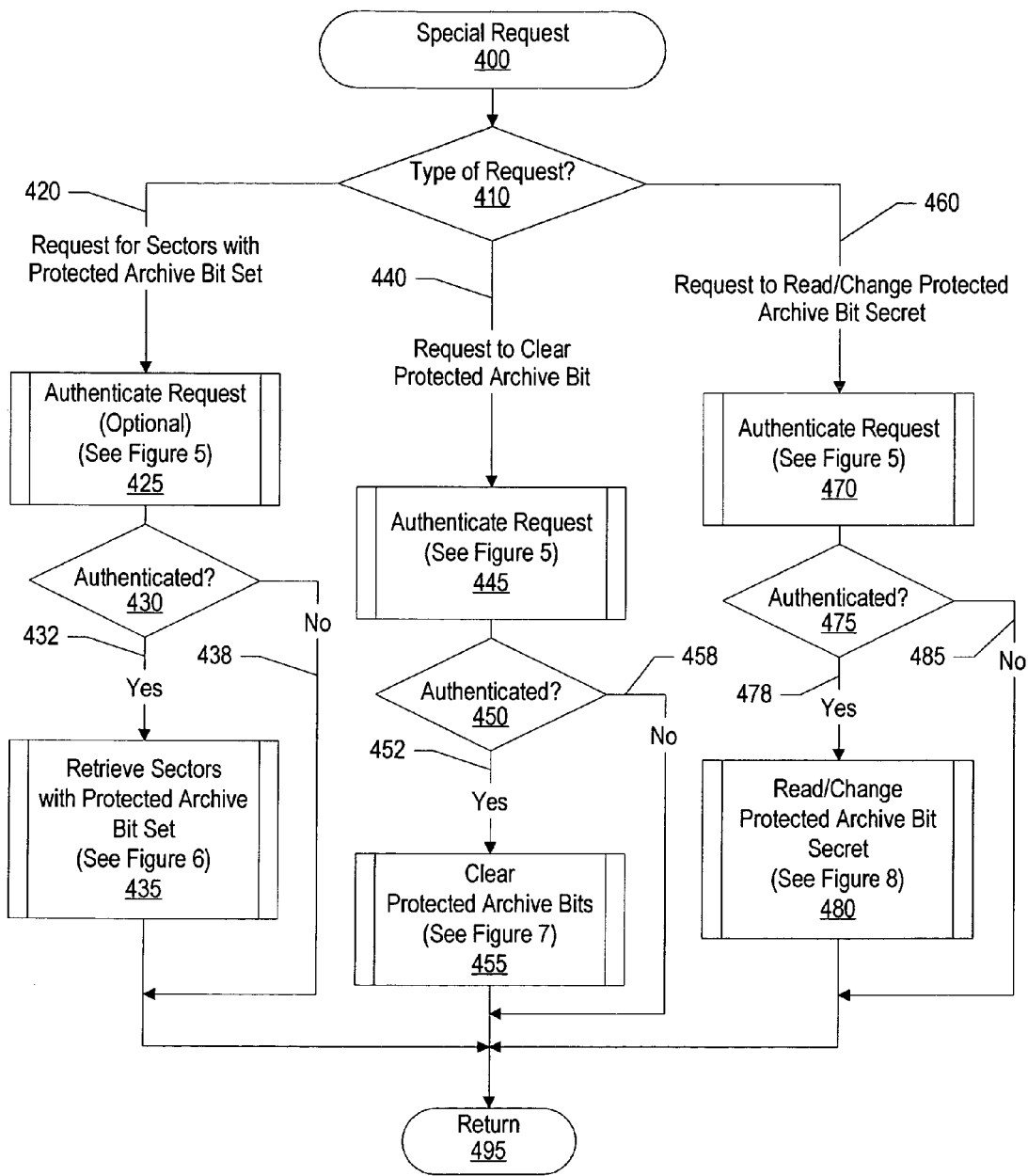
FIG. 4 is a flowchart showing high-level disk operation steps taken to handle a special request.

FIG. 4 is a flowchart showing high-level disk operation steps taken to handle a special request. Special request processing commences at 400 whereupon, a determination is made as to the type of special request being made (decision 410). If the request is a request for sectors in which the protected archive bit has been set, decision 410 branches to branch 420 whereupon the request is optionally authenticated (predefined process 425, see FIG. 5 and corresponding text for processing details). The reason authentication is optional is because the request is not changing the protected archive bits, so security of the protected archive bits is not as important. If authentication is required, a determination is made as to whether the request is authentic (decision 430). If the request was authenticated, or if authentication is not required, decision 430 branches to "yes" branch 432 whereupon, at predefined process 435, the sectors in which the protected archive bits have been set are retrieved (see FIG. 6 and corresponding text for processing details). Sectors in which the protected archive bits are set indicate the sectors of files that have been altered since the last virus scan was performed. On the other hand, if the request was required but not authenticated, decision 430 branches to "no" branch 438 bypassing predefined process 435.

Figure 5:
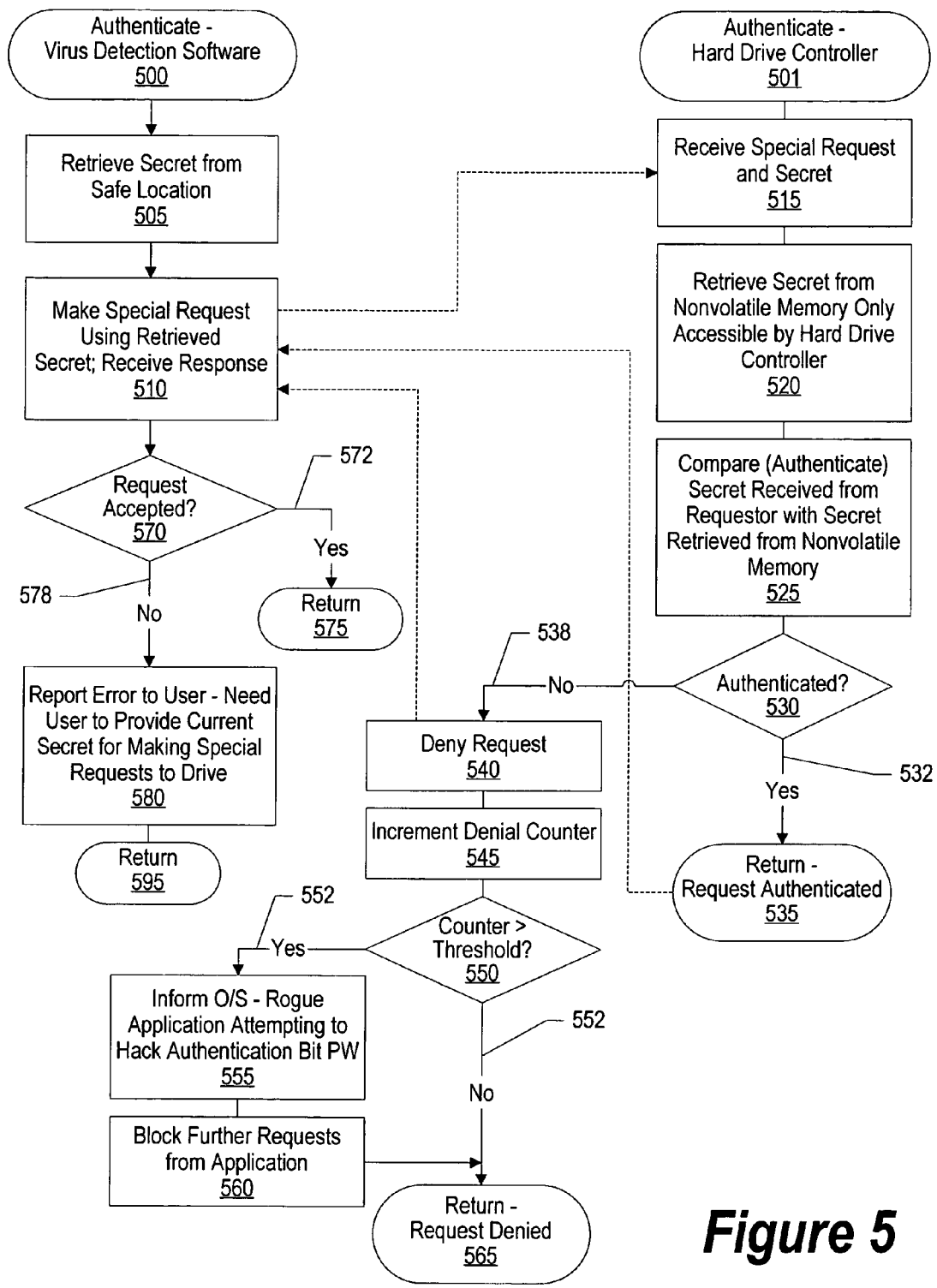
FIG. 5 is a flowchart showing steps taken to authenticate an application requesting access to a disk's protected archive bit data.

Returning to decision 410, if the special request is to clear protected archive bits, decision 410 branches to branch 440 whereupon the request is authenticated at predefined process 445 (see FIG. 5 and corresponding text for processing details). A determination is made as to whether the request is authenticated based upon the secret maintained by the hard disk (decision 450). If the request was authenticated, decision 450 branches to "yes" branch 452 whereupon, at predefined process 455, the protected archive bits corresponding to the requested sectors are reset, or cleared (see FIG. 7 and corresponding text for processing details). On the other hand, if the request was not authenticated, decision 450 branches to "no" branch 458 bypassing predefined process 455.

Returning once again to decision 410, if the special request is to either read or change the secret maintained by the hard drive to protect the protected archive bits, then decision 410 branches to branch 460. The request is authenticated at predefined process 470 (see FIG. 5 and corresponding text for processing details). A determination is made as to whether the request was authenticated (decision 475). If the request was authenticated, decision 475 branches to "yes" branch 478 whereupon the secret used by the hard drive to control access to the protected archive bits is read or changed (predefined process 480, see FIG. 8 and corresponding text for processing details). On the other hand, if the request was not authenticated, decision 475 branches to "no" branch 485 bypassing predefined process 480.

After the special request has been handled, processing returns to the calling routine at 495.

FIG. 5 is a flowchart showing steps taken to authenticate an application requesting access to a disk's protected archive bit data. Virus protection application processing commences at 500 whereupon, at step 505, the virus protection application retrieves the secret used with the hard drives protected archive bits from a safe location, such as an encrypted file. At step 510, the virus protection application makes a special request using the retrieved secret. In one embodiment, the virus protection application installs a public key on the hard drive and the corresponding private key is stored in the safe location. When the virus protection application makes a special request, it signs the request using the private key and when the hard drive controller receives the request it authenticates the request by checking the digital signature of the request. In another embodiment, to further protect the request, the secret is used to encrypt the request in addition to the use of the digital signature. It will be appreciated by those skilled in the art, having benefit of the present detailed description, that many other means are available for securing the requests to and from the hard drive controller. For example, the protected archive bits could be secured using public key-private key encryption in addition to or in lieu of using digital signatures. Additional, a simple shared key, such as a password, could be used to encrypt the request.

Hard drive controller processing commences at 501 whereupon, at step 515, the hard drive controller receives the special request and the secret from the virus protection application. At step 520, the hard drive controller retrieves the corresponding secret from a nonvolatile memory location that is only accessible to the hard drive controller (i.e., the location is not memory mapped to memory accessible by processes running on the computer system's processor). At step 530, the secret received from the virus protection application is compared with the secret that was retrieved from the nonvolatile memory. A determination is made as to whether the secret received from the virus protection application matches or is otherwise authenticated (decision 530). If the secret matches or is otherwise authenticated, decision 530 branches to "yes" branch 532 and processing returns at 535 authenticating the request and returning an appropriate return code to the virus protection application.

On the other hand, if the secret does not match or is not authenticated, decision 530 branches to "no" branch 535 whereupon, at step 540 the request is denied by the hard drive controller. At step 545, a denial counter is incremented to keep track of the number of times an application attempts to gain access to the hard drive's protected archive bit information. A determination is made as to whether the counter is greater than a threshold established to signify a rogue application that is trying to gain access by hacking into the hard drive's protected archive bit information (decision 550). If the threshold has been exceeded, decision 550 branches to "yes" branch 552 whereupon, at step 555, the operating system is informed that a rogue process is attempting to hack the protected archive bit secret and, at step 560, the hard drive controller blocks further requests that are received from the rogue process. On the other hand, if the counter is not exceeded, decision 550 branches to "no" branch 552 bypassing steps 555 and 560. Hard drive controller processing thereafter returns at 565 with the request being denied.

Returning to virus protection application processing, the virus protection application receives a response to the virus protection application's request at 510. A determination is made as to whether the request was accepted (decision 570). If the request was accepted, decision 570 branches to "yes" branch 572 whereupon processing returns successfully at 575. On the other hand, if the request was not accepted, decision 570 branches to "no" branch 578 whereupon, at step 580, an error is reported to the user informing the user that the virus protection application needs the secret installed in the hard drive in order to perform incremental scans. Virus protection application processing thereafter returns, unsuccessfully, at 595.

Figure 6:
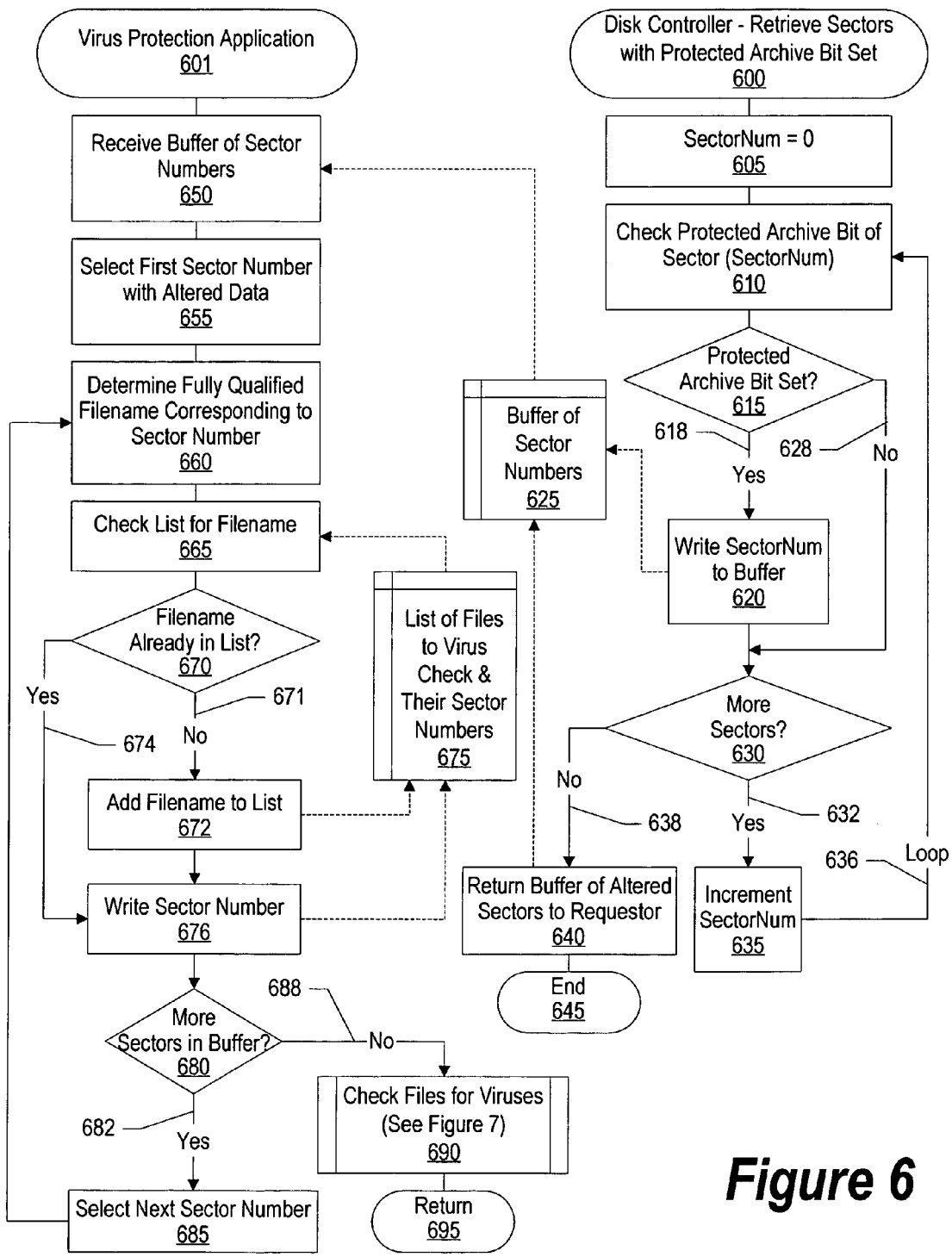
FIG. 6 is a flowchart showing steps taken by a virus protection software application working with the disk controller to retrieve a list of files to virus check based on the corresponding protected archive bits.

FIG. 6 is a flowchart showing steps taken by a virus protection software application working with the disk controller to retrieve a list of files to virus check based on the corresponding protected archive bits. Hard drive controller processing commences at 600 after the hard drive controller has received the request to return the sector numbers of sectors with data that has been altered (see FIG. 4 and corresponding text for details regarding the request to the hard drive controller for such sector). The hard drive controller initializes the sector number to the first sector on the hard disk (i.e., sector number zero), at step 605. At step 610, the hard drive controller checks the protected archive bit of the selected sector to see whether the bit has been set (indicating that the data in the sector has been altered). A determination is made as to whether the protected archive bit of the selected sector has been set (decision 615). If the bit has been set, decision 615 branches to "yes" branch 618 whereupon, at step 620, the selected sector number is written to buffer 625. On the other hand, if the protected archive bit for the selected sector has not been set (indicating that the data in the selected sector has not been altered since the last virus scan), then decision 615 branches to "no" branch 628 bypassing step 620.

A determination is made as to whether there are more sectors on the hard disk to process (decision 630). If there are more sectors, decision 630 branches to "yes" branch 632 whereupon, at step 635, the sector number is incremented and processing loops back to determine whether the protected archive bit of the newly selected sector has been set. This looping continues until there are no more sectors to process, at which point decision 630 branches to "no" branch 638. At step 640, the buffer that includes the list of sectors with data that has been altered is returned to the requester, and hard drive controller processing ends at 645. In the embodiment shown in FIG. 6, the hard drive controller is shown collecting the sector numbers based upon the sectors, protected archive bit settings. In another embodiment, steps 605 through 640 are performed by a process, such as the virus protection application, that does not reside within the hard drive controller. In this second embodiment, the protected archive bit information is able to be read by the process being executed by the computer system's processor through read requests that are sent to the hard drive controller by the process.

Virus protection application processing commences at 601 whereupon, at step 650, the virus protection application receives the buffer (buffer 625) returned by the hard drive controller that contains the sector numbers of sectors with data that has been changed since the last virus scan. At step 655, the virus protection application selects the first sector from buffer 625 and, at step 660, the virus protection application determines the fully qualified filename to which the sector belongs. In one embodiment, the sectors used to store a given filename are stored in a linked list so that, upon request, the linked list can be traversed to read all of the sectors that have data belonging to the filename. In such an embodiment, the linked lists corresponding to the various files are searched for the sector number during step 660.

When processing the first sector, the corresponding filename would not be in the list of files to virus check, so decision 670 will branch to "no" branch 671 and, at step 672, the filename is added to list 675 and, at step 676, the sector number is added to the list as well. However, when processing other sectors from buffer 625, step 665 will determine if the corresponding filename is already in list 675 of filenames that will be checked for viruses. This prevents duplicate filenames being inserted into list 675 so that the virus protection application only scans a given file once for viruses. If a subsequent filename is already in list 675, then decision 670 branches to "yes" branch 674 bypassing step 672 and, at step 676 the sector number is written to list 675. The sector number is recorded so that after the file is checked for viruses, the protected archive bits can be properly reset.

A determination is made as to whether there are more sector numbers in buffer 625 (decision 680). If there are more sector numbers to process, decision 680 branches to "yes" branch 682 whereupon, at step 685, the next sector number from buffer 625 is selected and processing loops back to determine the filename corresponding to the sector and to determine whether the filename is already included in list 675. This looping continues until all sector numbers have been processed, at which point decision 680 branches to "no" branch 688 whereupon the files in list 675 are checked for viruses (predefined process 690, see FIG. 7 and corresponding text for processing details). Virus protection application processing thereafter returns to the calling routine at 695.

Figure 7:
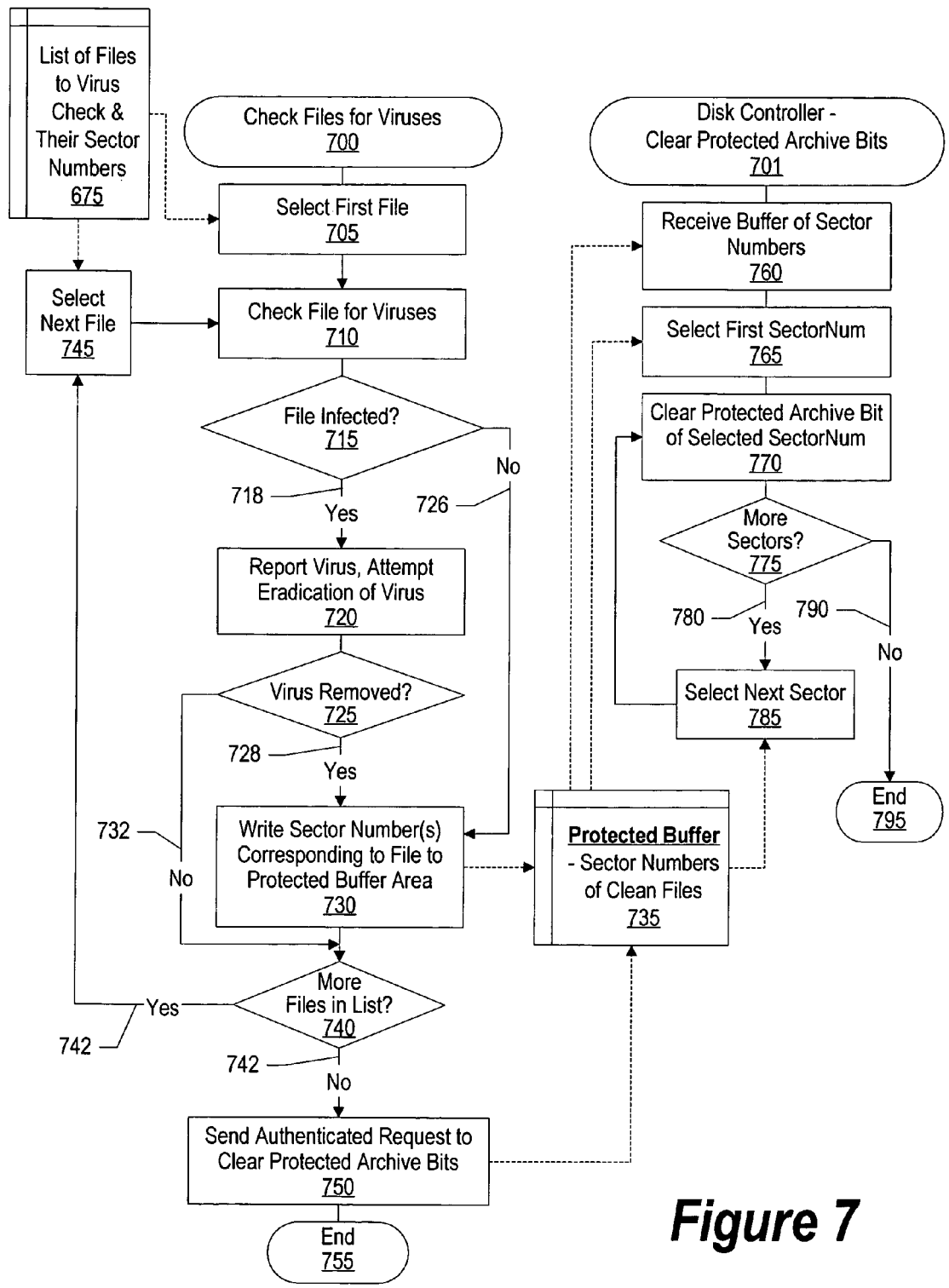
FIG. 7 is a flowchart showing steps taken to check identified files for viruses and return sector numbers of "clean files" to the disk controller.

FIG. 7 is a flowchart showing steps taken to check identified files for viruses and return sector numbers of "clean files" to the disk controller. Virus protection application processing commences at 700 whereupon, at step 705, the virus protection application selects the first file listed in list 675. List 675 includes a list of files that were altered since the last virus scan (see FIG. 6 and corresponding text for details regarding the creation of list 675). The virus protection application checks the selected file for viruses at step 710. A determination is made as to whether the file is infected (decision 715). If the file is infected, decision 715 branches to "yes" branch 718 whereupon, at step 720 the virus is reported and the virus protection application attempts to eradicate the virus from the file. A determination is made as to whether the eradication was successful (decision 725). If the virus was successfully removed, decision 725 branches to "yes" branch 728 whereupon, at step 730, the sector numbers corresponding to the file are written to protected buffer 735. In one embodiment, protected buffer is digitally signed or encrypted with the secret that is shared between the virus protection application and the hard drive controller (e.g., a public key-private key pair, a shared key or password, etc.).

On the other hand, if the virus protection application was unable to remove the virus from the file, decision 725 branches to "no" branch 732 bypassing step 730 so that further action, such as deleting or quarantining the infected file, can be taken. Returning to decision 715, if the file is not infected with a virus, decision 715 branches to "no" branch 726 bypassing step 720 and the sector numbers corresponding to the file are written to protected buffer 735 at step 730.

A determination is made as to whether there are more files to process in list 675. If there are more files to process, decision 740 branches to "yes" branch 742 whereupon, at step 745, the next file in the list is selected and processing loops back to scan and process the newly selected file. This looping continues until there are no more files in the list, at which point, decision 740 branches to "no" branch 742 whereupon, at step 750, an authenticated request is sent to the hard drive controller to clear the protected archive bits for the sectors included in protected buffer 735 (see FIG. 4 and corresponding text for details regarding the authentication of the virus protection application's request to the hard drive controller to clear protected archive bits). Virus protection application processing thereafter returns to the calling routine at 755.

Turning to hard drive controller processing, the hard drive controller processing commences at 701 whereupon the hard drive controller receives an authenticated request to clear the protected archive bits for the sector numbers that are included in protected buffer 735. Hard drive controller receives protected buffer 735 through an interface, such as a high speed bus, with the processor. The hard drive controller authenticates the request (see FIGS. 4 and 5 and corresponding text for authentication details) and, at step 760 receives the buffer of sector numbers that are to be cleared (i.e., reset). At step 765, the first sector number within buffer 735 is selected and, at step 770, the protected archive bit for the selected sector is cleared. A determination is made as to whether there are more sector numbers to process within protected buffer 735 (decision 775). If there are more sector numbers to process, decision 775 branches to "yes" branch 778 whereupon, at step 780, the next sector number is retrieved from protected buffer 735 and processing loops back to clear the protected archive bit corresponding to the newly selected sector number. This looping continues until there are no more sector numbers to process, at which point decision 775 branches to "no" branch 790 and hard drive controller processing ends at 795.

In the embodiment described above, the hard drive controller receives a list of sector numbers in a buffer and clears the protected archive bits. In another embodiment, the virus protection application could loop through the sector numbers and make individual, authenticated, requests to the hard drive controller to clear the protected archive bit. The implementation described in FIG. 7 has the advantage that a block of sector numbers can be passed with a single request to clear the associated protected archive bits, increasing efficiency. However, if the logic for clearing protected archive bits for a block of section numbers is not included in the hard drive controller, then the second implementation may be used.

Figure 8:
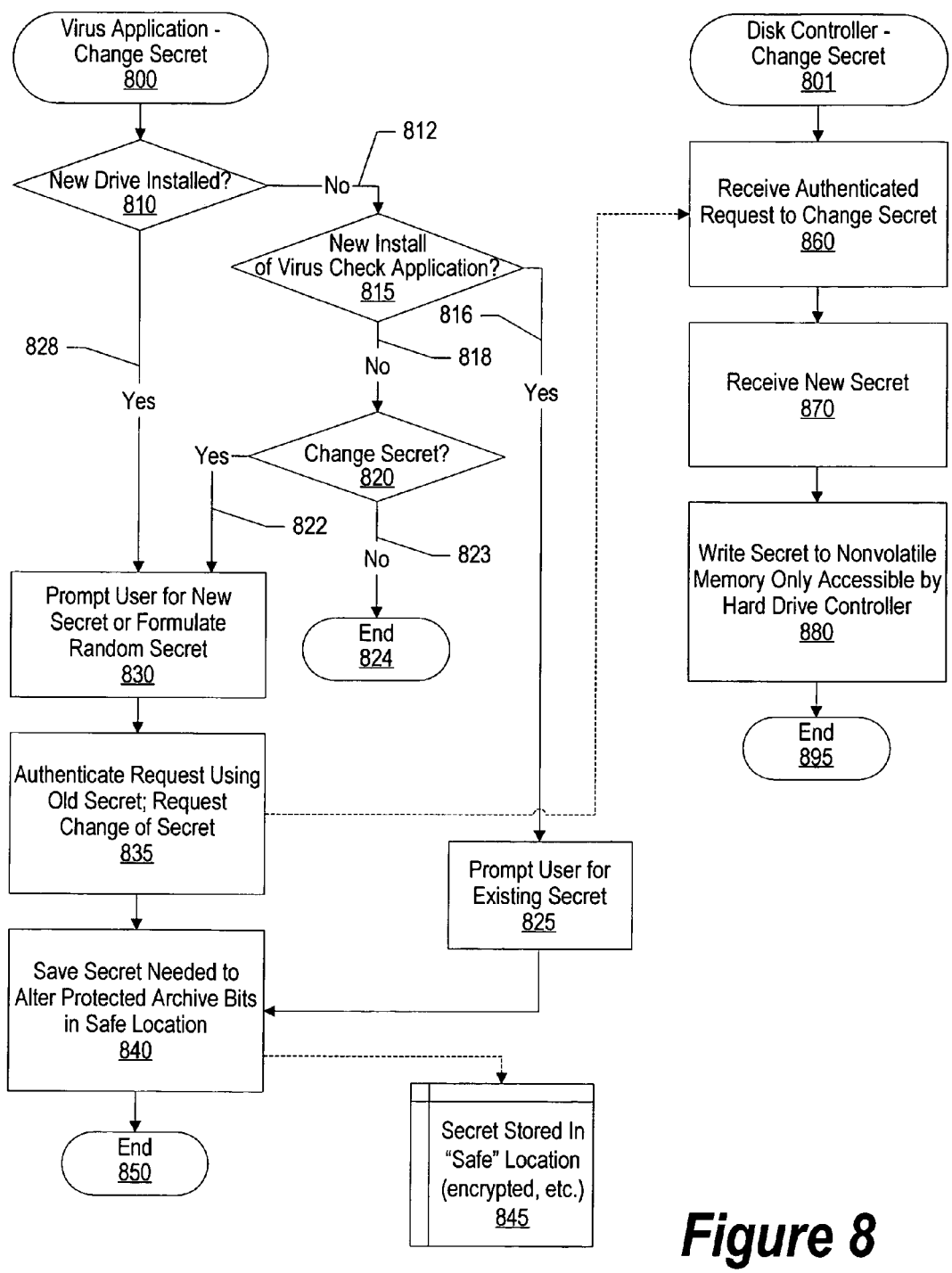
FIG. 8 is a flowchart showing steps taken to change protection information associated with the protected archive bit.

FIG. 8 is a flowchart showing steps taken to change protection information associated with the protected archive bit. In one embodiment, the hard drive may be initially shipped with no password or a default password. When multiple drives are being scanned by a single virus protection application, it may be advantageous to have a common secret, such as a password or key, between the various drives, so that the virus protection application can use the same secret irregardless of the physical drive on which the data is located. Thus, the virus protection application is able to work with protected archive bits on any of the drives but such information would be inaccessible to any viruses or rogue applications.

Virus protection application processing commences at 800 whereupon a determination is made as to whether a new drive is being installed (decision 810). If a new drive is not being installed, decision 810 branches to "no" branch 812 whereupon a determination is made as to whether the virus protection application is being installed (decision 815). If the virus protection application is not being installed, then decision 815 branches to "no" branch 818 whereupon a determination is made as to whether the user or the virus protection application is changing the secret (decision 820). If the secret is not being changed, decision 820 branches to "no" branch 823 whereupon processing ends at 824.

Returning to decision 815, if the virus protection application is being installed, decision 815 branches to "yes" branch 816 whereupon, at step 825, the user is prompted for the existing secret. At step 840, the virus protection application saves the secret in safe location 845 (i.e., an encrypted file, etc.).

Returning to decision 810 and 820, if either a new drive is being installed or the secret is being changed, decisions 810 and 820 branch to "yes" branches 828 and 822, respectively whereupon, at step 830 the user is prompted for a new secret or, in one embodiment, the virus protection application formulates a random secret. At step 835, a request to change the secret is sent to the hard drive controller, authenticated with the old secret. If no secret was associated with the drive (e.g., a newly installed drive), then the request to change the secret may not need to be authenticated. At step 840, the virus protection application saves the secret in safe location 845 (i.e., an encrypted file, etc.). Virus protection application processing thereafter ends at 850.

Turning to hard drive controller processing, processing commences at 801 whereupon, at 860 the hard drive controller receives an authenticated request to change the secret used to control access to the protected archive bits (see FIG. 4 and corresponding text for details regarding the authentication of the request). At step 870 the hard drive controller receives the new secret and, at step 880, the hard drive controller stores the new secret in a nonvolatile memory or drive location that is only accessible by the hard drive controller. Hard drive controller processing thereafter ends at 895.

Figure 9:
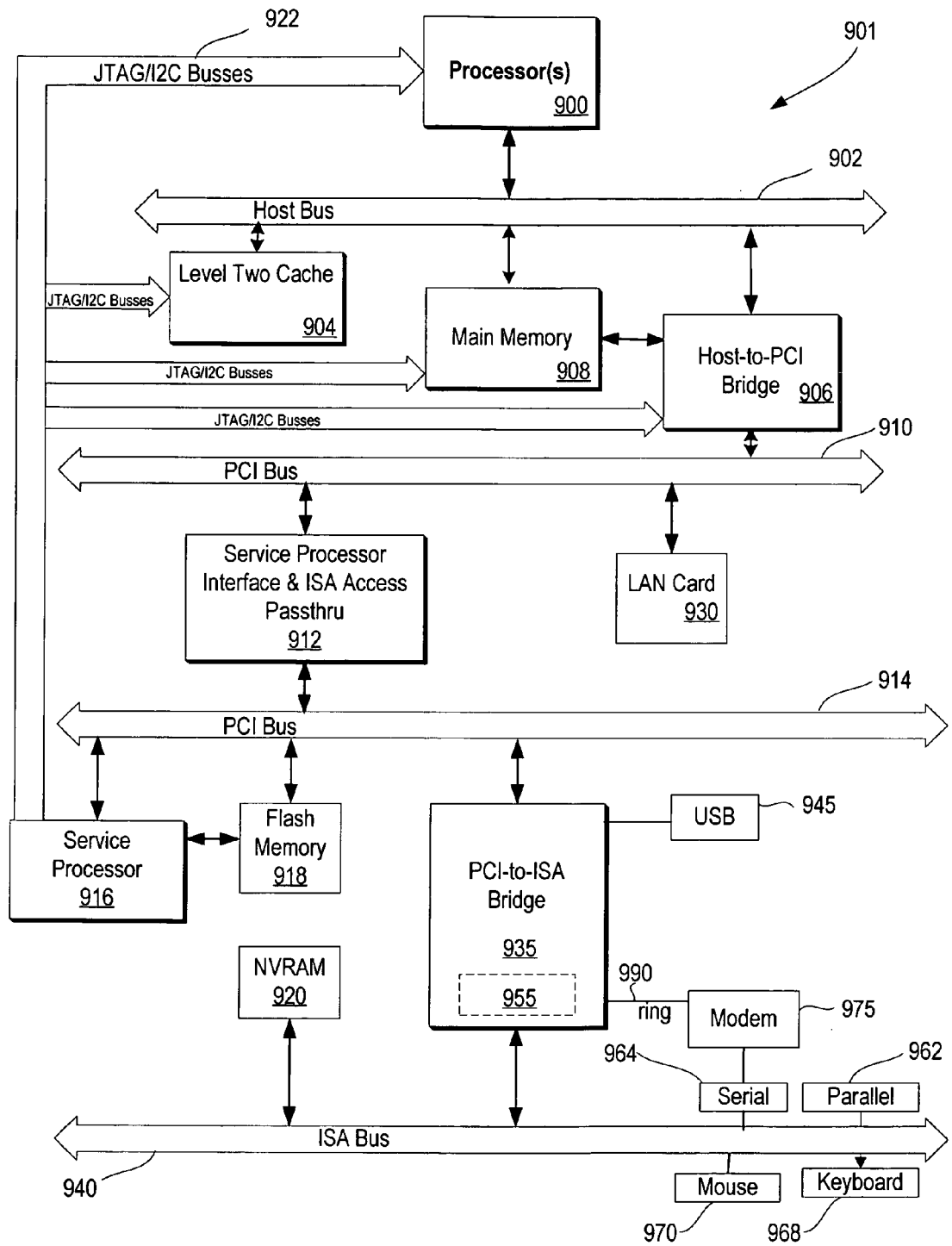
FIG. 9 is a block diagram of an information handling system capable of implementing the present invention.

FIG. 9 illustrates information handling system 901 which is a simplified example of a computer system capable of performing the computing operations described herein. Computer system 901 includes processor 900 which is coupled to host bus 902. A level two (L2) cache memory 904 is also coupled to host bus 902. Host-to-PCI bridge 906 is coupled to main memory 908, includes cache memory and main memory control functions, and provides bus control to handle transfers among PCI bus 910, processor 900, L2 cache 904, main memory 908, and host bus 902. Main memory 908 is coupled to Host-to-PCI bridge 906 as well as host bus 902. Devices used solely by host processor(s) 900, such as LAN card 930, are coupled to PCI bus 910. Service Processor Interface and ISA Access Pass-through 912 provides an interface between PCI bus 910 and PCI bus 914. In this manner, PCI bus 914 is insulated from PCI bus 910. Devices, such as flash memory 918, are coupled to PCI bus 914. In one implementation, flash memory 918 includes BIOS code that incorporates the necessary processor executable code for a variety of low-level system functions and system boot functions.

PCI bus 914 provides an interface for a variety of devices that are shared by host processor(s) 900 and Service Processor 916 including, for example, flash memory 918. PCI-to-ISA bridge 935 provides bus control to handle transfers between PCI bus 914 and ISA bus 940, universal serial bus (USB) functionality 945, power management functionality 955, and can include other functional elements not shown, such as a real-time clock (RTC), DMA control, interrupt support, and system management bus support. Nonvolatile RAM 920 is attached to ISA Bus 940. Service Processor 916 includes JTAG and I2C busses 922 for communication with processor(s) 900 during initialization steps. JTAG/I2C busses 922 are also coupled to L2 cache 904, Host-to-PCI bridge 906, and main memory 908 providing a communications path between the processor, the Service Processor, the L2 cache, the Host-to-PCI bridge, and the main memory. Service Processor 916 also has access to system power resources for powering down information handling device 901.

Peripheral devices and input/output (I/O) devices can be attached to various interfaces (e.g., parallel interface 962, serial interface 964, keyboard interface 968, and mouse interface 970 coupled to ISA bus 940. Alternatively, many I/O devices can be accommodated by a super I/O controller (not shown) attached to ISA bus 940.

In order to attach computer system 901 to another computer system to copy files over a network, LAN card 930 is coupled to PCI bus 910. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
    setting a plurality of protected archive bits in response to altering data stored in a plurality of sectors of a hard drive, wherein each protected archive bit corresponds to a different sector;
    identifying one or more files that correspond to the plurality of sectors, the identification based upon the sectors' corresponding protected archive bits;
    scanning the identified files for viruses;
    authenticating a request to reset one or more of the protected archive bits that correspond to one or more of the sectors, wherein the request is made in response to the scanning;
    resetting the protected archive bits in response to the authentication;
    storing a first secret in a nonvolatile storage location that is accessible only to a hard drive controller that performs the setting and resetting of the protected archive bits;
    storing a second secret in a safe location accessible by a virus protection application that performs the scanning; and
    wherein the authenticating further includes comparing the first secret with the second secret, wherein the comparing further includes:
        creating a digital signature based upon the second secret; and
        verifying the digital signature using the first secret.

2. The method of claim 1 wherein the safe location is selected from the group consisting of an encrypted file and a storage area sealed with a Trusted Platform Module.

3. The method of claim 1 further comprising:
    retrieving a list of sector identifiers identifying the plurality of sectors prior to the scanning, wherein the retrieving includes transmitting the list of sector identifiers from a hard drive controller to a virus protection application that performs the scanning.

4. The method of claim 1 further comprising:
receiving, at a hard drive controller, a request to write data to a sector on a disk drive;
writing the data to the sector in response to the request; and
setting the protected archive bit corresponding to the sector indicating that the sector's data has been altered.

5. The method of claim 4 wherein each sector includes a sector identifier, the protected archive bit, and a data area, and wherein the data is written to the sector's data area.

6. An information handling system comprising:
one or more processors;
a memory accessible by the processors;
an hard drive controller that manages a disk that includes a plurality of sectors, wherein each sector includes a sector identifier, a protected archive bit, and a data area;
a nonvolatile storage location that is accessible only to the hard drive controller;
incremental virus protection application software executed by an operating system being executed by the processors, the virus protection application software effective to:
set a plurality of the protected archive bits in response to altering data stored in a plurality of the sectors of disk;
identify one or more files that correspond to the plurality of sectors, the identification based upon the sectors' corresponding protected archive bits;
scan the identified files for viruses;
authenticate a request to reset one or more of the protected archive bits that correspond to one or more of the sectors, wherein the request is made in response to the scan;
reset the protected archive bits in response to the authentication;
store a first secret in the nonvolatile storage location prior to executing the software effective to set and reset the protected archive bits;
store a second secret in a safe location accessible by the virus protection application; and
wherein the software effective to authenticate further includes software code effective to compare the first secret with the second secret, wherein the software code effective to compare further includes:
software code effective to create a digital signature based upon the second secret; and
software code effective to verify the digital signature using the first secret.

7. The information handling system of claim 6 wherein the safe location is selected from the group consisting of an encrypted file and a storage area sealed with a Trusted Platform Module.

8. The information handling system of claim 6 further comprising:
software code effective to retrieve a list of sector identifiers identifying the plurality of sectors prior to the scanning, wherein the software code effective to retrieve includes software code effective to transmit the list of sector identifiers from the hard drive controller to the virus protection application software.

9. The information handling system of claim 6 further comprising:
software code effective to receive, at the hard drive controller, a request to write data to a sector on a disk drive;
software code effective to write the data to the sector in response to the request;
and
software code effective to set the protected archive bit corresponding to the sector indicating that the sector's data has been altered.

10. A computer program product stored in a computer readable storage medium that stores computer instructions which, when executed by an information handling system, causes the information handling system to perform actions comprising:
setting a plurality of protected archive bits in response to altering data stored in a plurality of sectors of a hard drive, wherein each protected archive bit corresponds to a different sector;
identifying one or more files that correspond to the plurality of sectors, the identification based upon the sectors' corresponding protected archive bits;
scanning the identified files for viruses;
authenticating a request to reset one or more of the protected archive bits that correspond to one or more of the sectors, wherein the request is made in response to the scanning;
resetting the protected archive bits in response to the authentication;
storing a first secret in a nonvolatile storage location that is accessible only to a hard drive controller that performs the setting and resetting of the protected archive bits;
storing a second secret in a safe location accessible by a virus protection application that performs the scanning; and
wherein the authenticating further includes comparing the first secret with the second secret, wherein the comparing further includes:
creating a digital signature based upon the second secret; and
verifying the digital signature using the first secret.

11. The computer program product of claim 10 wherein the safe location is selected from the group consisting of an encrypted file and a storage area sealed with a Trusted Platform Module.

12. The computer program product of claim 10 further comprising:
software code effective to retrieve a list of sector identifiers identifying the plurality of sectors prior to executing the software code effective to scan, wherein the software code effective to retrieve includes software code effective to transmit the list of sector identifiers from a hard drive controller to a virus protection application that performs the scan.

13. The computer program product of claim 10 further comprising:
software code effective to receive, at a hard drive controller, a request to write data to a sector on a disk drive;
software code effective to write the data to the sector in response to the request;
and
software code effective to set the protected archive bit corresponding to the sector indicating that the sector's data has been altered.

14. The computer program product of claim 13 wherein each sector includes a sector identifier, the protected archive bit, and a data area, and wherein the data is written to the sector's data area.

* * * * *